United States Patent [19]
Harvey

[11] 3,718,392
[45] Feb. 27, 1973

[54] INTERLOCKING DUAL PURPOSE SLIDE TRAY STRUCTURE FOR FORMING A SINGLE TRAY OR A PAIR OF TRAYS

[75] Inventor: Donald M. Harvey, Rochester, N.Y.

[73] Assignee: Eastman Kodak Company, Rochester, N.Y.

[22] Filed: June 4, 1970

[21] Appl. No.: 43,328

[52] U.S. Cl. .................353/111, 353/103, 353/93, 353/120, 206/62

[51] Int. Cl....G03b 23/02, G03b 23/16, G03b 21/14

[58] Field of Search......353/103, 104, 105, 106, 111, 353/114, 116, 120, 122; 206/62 R, 73; 40/179

[56] References Cited

UNITED STATES PATENTS

R25,327   2/1963   Anderton..........................353/103
2,998,665  9/1961   Diemer.............................353/116

Primary Examiner—Leonard Forman
Assistant Examiner—A. J. Mirabito
Attorney—Robert W. Hampton and Steve W. Gremban

[57] ABSTRACT

A slide tray structure for lap dissolve slide projectors having interleaved tray portions movable between a contracted position, in which a single tray is formed for the loading, editing and storing of slides, and for use in a standard projector, and an expanded position, in which two trays are formed for use in a lap dissolve slide projector of the type utilizing a pair of slide trays.

8 Claims, 13 Drawing Figures

PATENTED FEB 27 1973
3,718,392
SHEET 1 OF 4
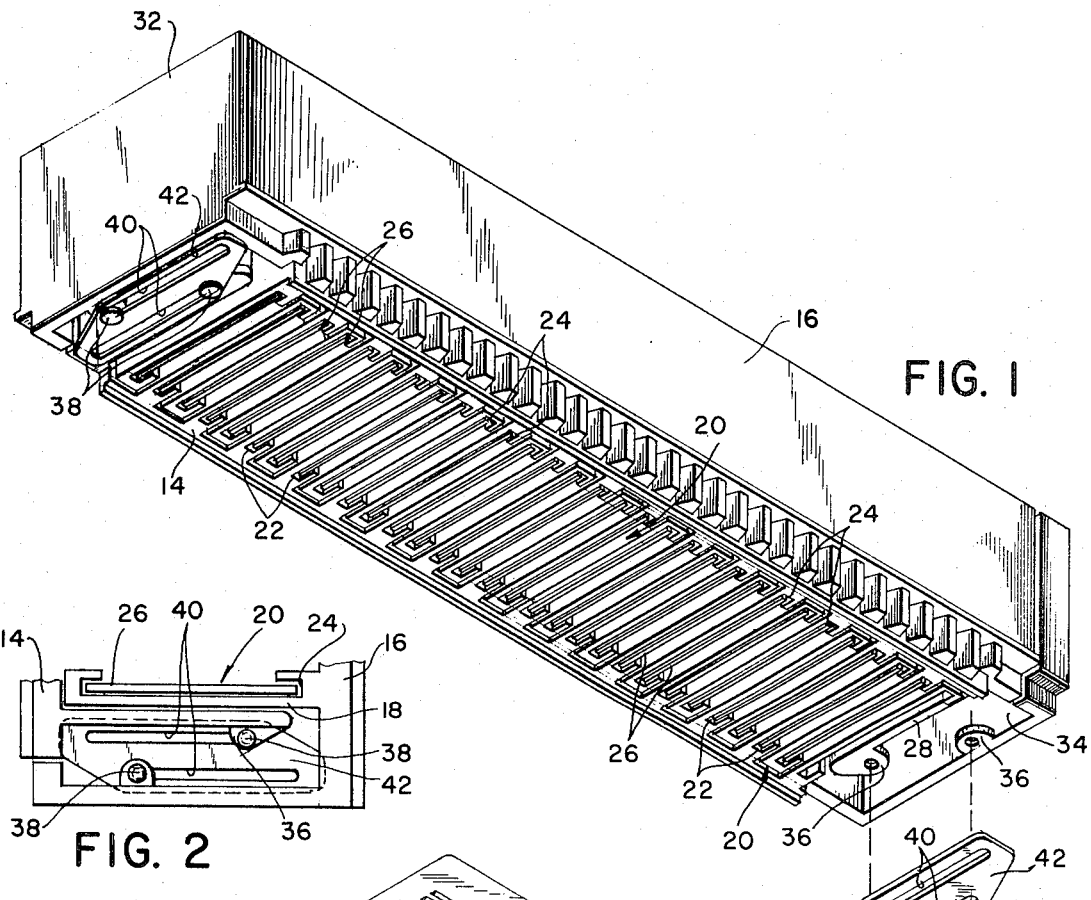
FIG. 1
FIG. 2
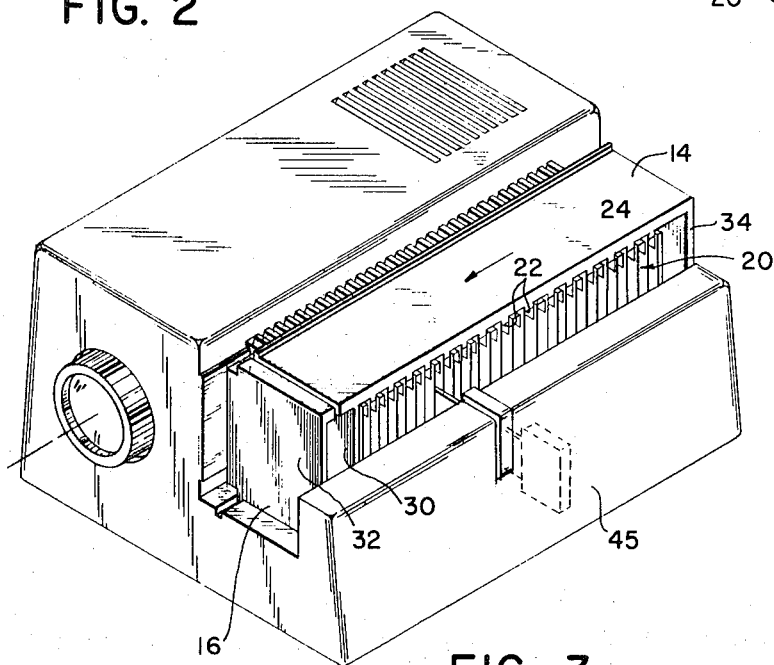
FIG. 3
DONALD M. HARVEY
INVENTOR.
BY Steve W. Grembow
Robert W. Hampton
ATTORNEYS

DONALD M. HARVEY
INVENTOR.

BY *Steve W. Grambau*
*Robert W. Hampton*
ATTORNEYS

INTERLOCKING DUAL PURPOSE SLIDE TRAY STRUCTURE FOR FORMING A SINGLE TRAY OR A PAIR OF TRAYS

BACKGROUND OF THE INVENTION

1. Field of the Invention

This invention relates generally to slide trays, and more specifically to a dual purpose slide tray structure adaptable in one mode of operation to form a single tray, and in another mode of operation to form a pair of trays for use in lap dissolve slide projectors.

2. Description of the Prior Art

Slide trays having slide compartments with an opening at one end through which a slide may be introduced into the tray, and an opening at the opposite end through which a slide may removed from the slide compartment by any suitable means are well known in the art. It is also known to provide such slide trays with slide retaining means in the form of leaf springs engageable with the edge of the slide for retaining the slide in the slide compartment. It is further known to provide such trays with slide retaining means as disclosed in U.S. Pat. No. 3,146,666 comprising a stop plate preferably mounted at the end of a leaf spring and normally movable into the slide compartment opening for blocking passage of the slide, and movable by cam means or the like out of the opening to allow passage of a slide therethrough. In addition, lap dissolve slide projectors having two laterally adjacent stationary slide gates, each of which is associated with its own objective lens projection system for projecting an image of a slide in either gate on the same viewing area of a screen, are well known in the art. As the slide in one gate is being displayed, the previously projected slide is removed from the other gate and replaced by the next slide to be shown. To change from one projected image to the next, the brightness or illumination of the image being displayed is gradually reduced while the projected image of the slide in the other gate is gradually increased in brightness, thus causing the former image to fade away as the latter image simultaneously comes into view.

In most previously known lap dissolve projectors of the type described above, the fact that successive slides must be located alternately in two separate slide gates has necessitated the use of two slide trays, each of which provides slides only to the corresponding gate. Since the slides must be arranged in the two trays in uninterrupted alternate sequential order, this approach greatly complicates the task of editing or re-arranging the sequence in which the slides are to be displayed. Furthermore, the alternate sequential arrangement of the slides dictated by such a lap dissolve projector makes it impossible to display the same tray of slides in proper sequence with a conventional projector, or vice versa, without first re-arranging all of the slides. Alternatively, lap dissolve slide projectors of the same general type have been proposed which deliver successive consecutively arranged slides alternately into two slide gates from a single tray, but which do not preserve the original slide sequence, thus requiring the slides to be re-arranged each time they are displayed.

SUMMARY OF THE INVENTION

This invention includes within its scope a dual purpose slide tray structure usable for both standard single tray slide projectors and for lap dissolve slide projectors of the type utilizing a pair of trays in side-by-side relation. The slide tray structure comprises a pair of interleaved tray portions movable between a contracted position, in which a single tray is formed for loading, editing, and storing of slides and for use in standard single tray slide projectors, and an expanded position, in which a pair of trays is formed for use in a lap dissolve slide projector.

It is an object of the present invention to provide a dual purpose slide tray structure that is usable in one form as a single tray for a standard single tray slide projector, and is usable in another form as a pair of trays for a lap dissolve projector of the type utilizing a pair of slide trays in side-by-side relation.

The invention and its objects and advantages will become more apparent from the detailed description of the preferred embodiments presented below.

BRIEF DESCRIPTION OF THE DRAWING

In the detailed description of the preferred embodiments of the invention presented below, reference is made to the accompanying drawing, in which:

FIG. 1 is a bottom perspective view of a single slide tray constructed in accordance with a preferred embodiment of this invention;

FIG. 2 is a segmental, bottom elevational view of the slide tray of FIG. 1;

FIG. 3 is a bottom perspective view of a standard single tray slide projector using the slide tray of FIG. 1;

DESCRIPTION OF THE PREFERRED EMBODIMENT

Figure 4:
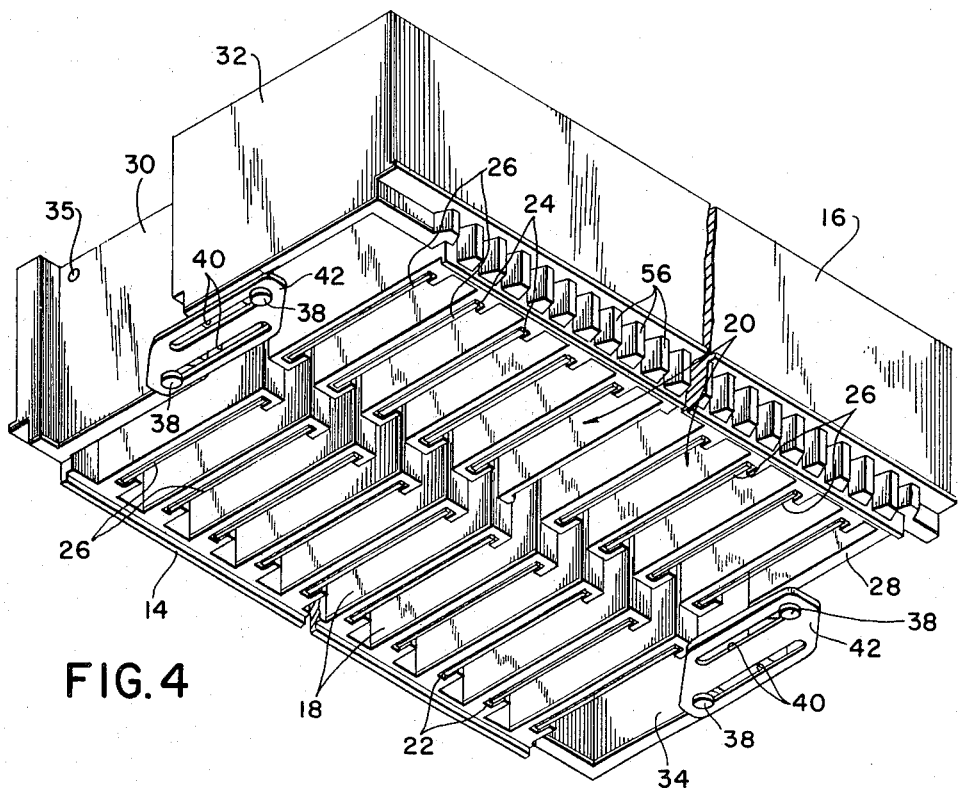
FIG. 4 is a bottom perspective view of the slide tray of FIG. 1 in its expanded position to form a pair of slide trays.

Because slide trays and projectors are well known, the present description will be directed in particular to elements forming part of or cooperating more directly with the present invention, slide tray or projector elements not specifically shown or described herein being understood to be selectable from those known in the art.

With reference to the drawings, the slide tray structure of this invention comprises a pair of substantially identical, interleaved slide tray portions 14, 16 adapted when expanded to form two trays and when combined to form one tray. Each of the tray portions 14, 16 have a plurality of parallel, spaced apart and laterally extending wall portions 18, 20 respectively forming slide tray compartments. The slide compartments 18, 20 have open ended passageways 22, 24 respectively for receiving slides 26. The slide tray portions 14, 16 further have short support walls 28, 30 respectively at one end and full width support walls 32, 34 respectively at the opposite end as best seen in FIGS. 1 and 2. The support walls have spaced flanges 36 for supporting pins 38 slidable within parallel arranged slots 40 in a connecting link 42 for connecting the support walls 28, 34, and 30, 32 of the slide tray portions 24, 16, and permitting relative movement of the slide tray portions between contracted and expanded positions. In the contracted position of the slide tray portions 14, 16 as best seen in FIGS. 1, 2 and 3, the wall portions 18 of tray portion 14 are received in the spaces between the wall portions 20 of tray portion 16 and vice versa to form a single tray for use in any standard single tray slide projector. In addition, the different shaped support walls 28, 34 and 30, 32 at the ends of the tray portions 14, 15 combine in such a way as to give the appearance of a unitary single slide tray. Also, in this contracted position, slides 26 may be loaded in the tray, slides edited, and slides stored upon the positioning of a cover member, not shown, on the tray. In addition, one or more detents comprising projections 35 on one wall portion 18 cooperating with corresponding recesses 37 on the adjacent wall portion 20, as best seen in FIG. 6, may be provided for releasably holding the slide tray portions 14, 16 in the contracted position.

Figure 5:
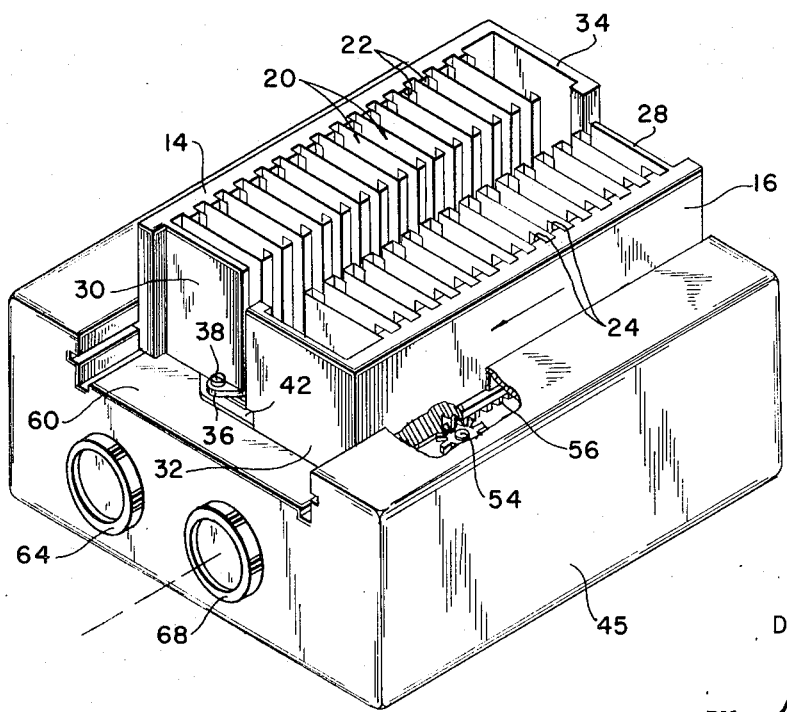
FIG. 5 is a perspective view of a lap dissolve slide projector utilizing the expanded slide tray of FIG. 4.
Figure 6:
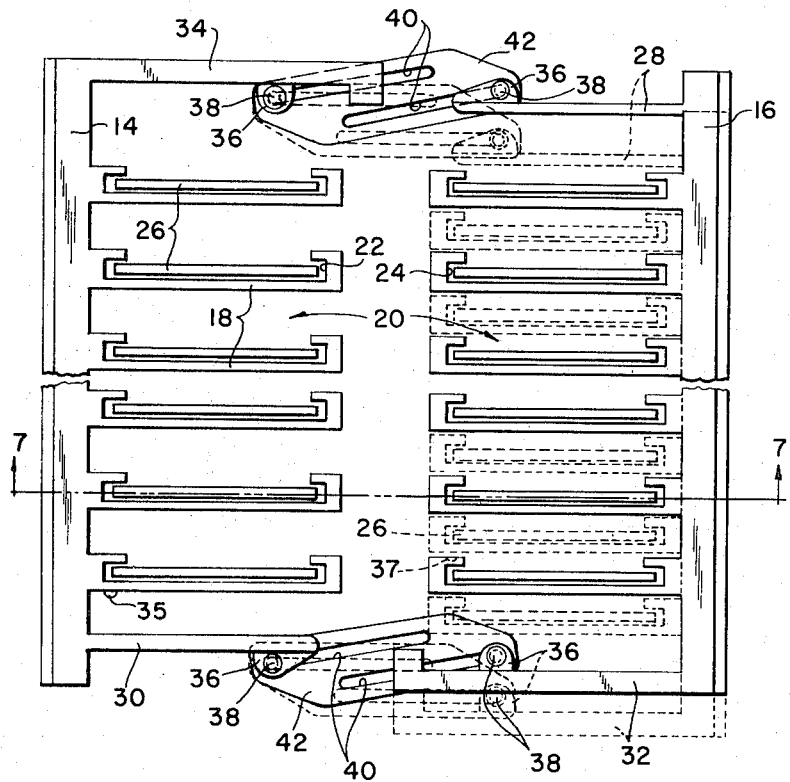
FIG. 6 is a bottom elevational view of the expanded slide tray of FIG. 4.

In the expanded position of the slide tray portions 14, 16 as best seen in FIGS. 4 and 6, a pair of slide trays is provided in parallel, side-by-side relation, suitable for use in a lap dissolve slide projector of the type seen in FIG. 5. In addition to permitting lateral movement of the slide tray portions 14, 16 to the expanded position, the connecting links 42 permit indexing movement of the slide tray portions 14, 16 relative to one another while in the expanded position in incremental steps, each equal to one slide compartment.

Figure 7:
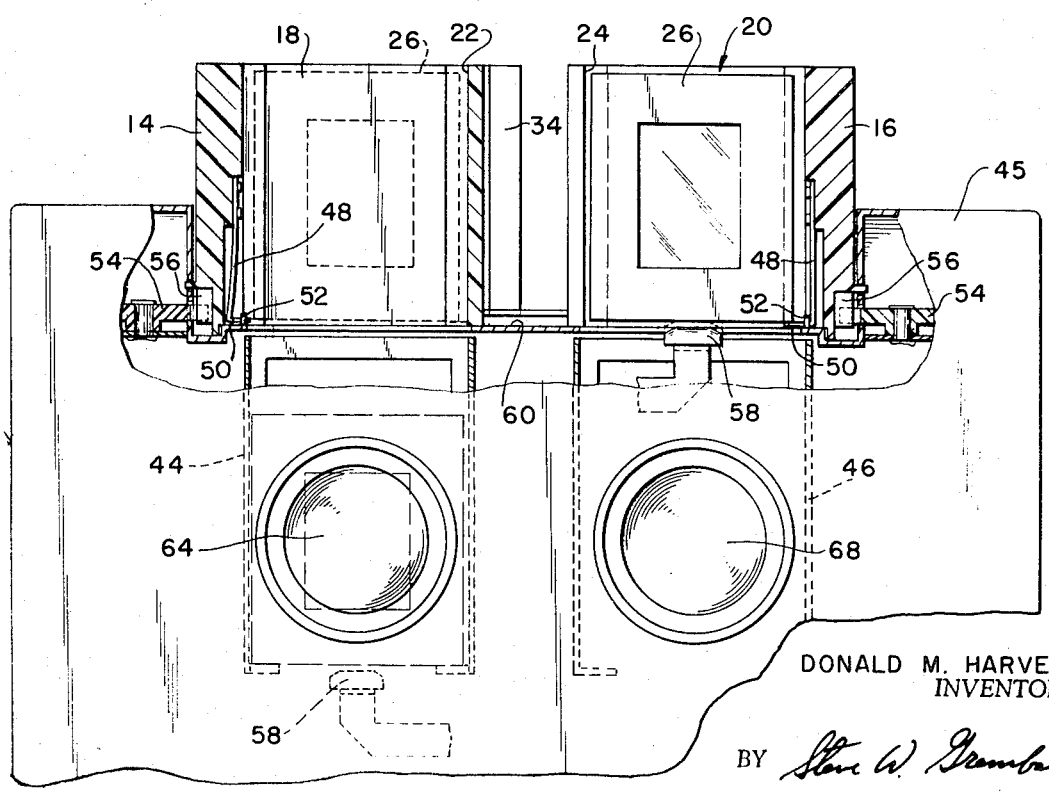
FIG. 7 is an enlarged segmental front elevational view, partly in section, of the slide projector of FIG. 5.
Figure 8:
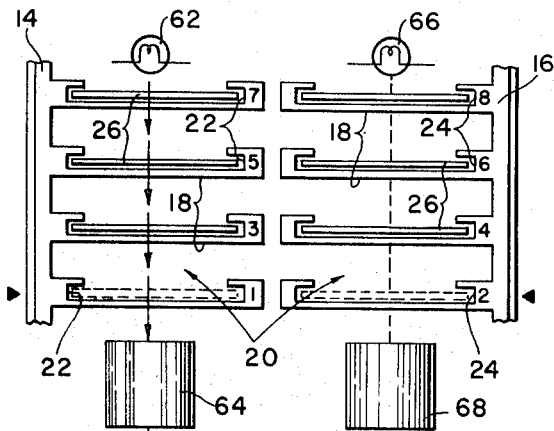
FIG. 8 is a segmental, schematic top plan view of a lap dissolve slide projector showing the slide tray in its expanded position, the slides in the first and second slide compartments moved to their respective projection positions, and the first slide being projected.

Since the lap dissolve slide projector 45 shown in FIGS. 5 and 7 is of the type in which slides 26 are dropped vertically into slide gates 44, 46 in position for projection, as indicated earlier, each of the slide tray portions 14, 16 have open ended slide compartments 18, 20 respectively permitting the introduction of a slide 26 into a compartment from one end for loading the tray, and discharging the slide from the other end, preferably by gravity, for slide projection. To retain the slides 26 in each slide tray compartment 18, 20, the inner surfaces of one side of each of the slide tray portions 14, 16 as seen in FIG. 7 is provided at the discharge end with any suitable flexible slide retainer 48 of the type disclosed and described in U.S. Pat. No. 3,146,666, which preferably runs along the entire length of the tray. These retainers 48 have laterally extending lips 50 for partially blocking off the open discharge ends of the slide compartments 18, 20 and retaining the slides therein. When the slide tray is mounted on slide projector 45, the slide retainers 48 are cammed out automatically in the region of the projection station or gates 44, 46 by any suitable pins 52 permitting the slides 26 to be moved into and out of the slide compartments 18, 20. The slide tray portions 14, 16 may be advanced until the front support walls 30, 32 strike suitable stop lugs or the like, not shown, on the slide projector 45 to position the tray portions 14, 16 with the first and second slide compartments in register with the entrance of the slide projection gates or stations 44, 46, which is in alignment with the arrow heads seen in FIG. 8 of each of the slide projection systems of slide projector 45. Any suitable slide tray indexing mechanism may be provided in slide projector 45, such as indexing gears 54 engageably with complimentary gear racks 56 in the tray portions 14, 16 as seen in FIGS. 5 and 7 for intermittently advancing each of the slide tray portions 14, 16 in succession. Since the slides 26 drop into the projection gates 44, 46 under the influence of gravity, the slide projector 45 is provided with any suitable slide lifting mechanism comprising lifter arm 58 for returning each of the projected slides 26 to its slide compartment 18, 20 and holding it there until the slide tray portion 14, 16 is indexed.

Figure 9:
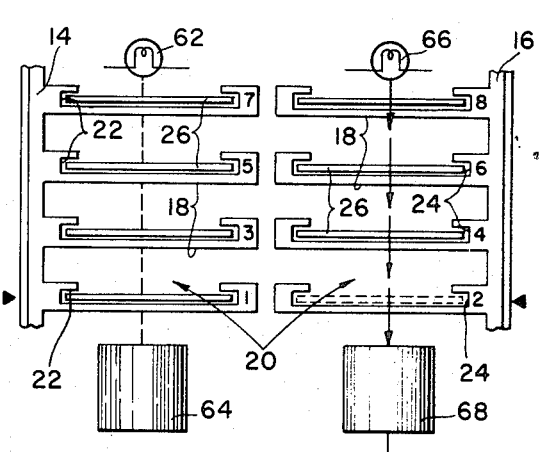
FIG. 9 is a view similar to FIG. 8 in which sequentially a dissolve occurs for projecting the second slide, and the first slide is returned to the first compartment.
Figure 10:
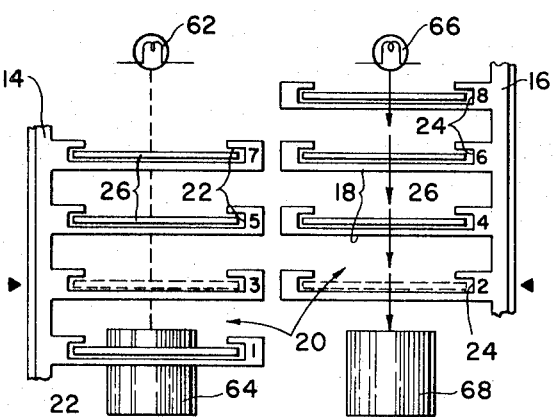
FIG. 10 is a view similar to FIG. 8 showing the left tray advanced one slide compartment, the third slide moved to its projection position, and the second slide being projected.
Figure 11:
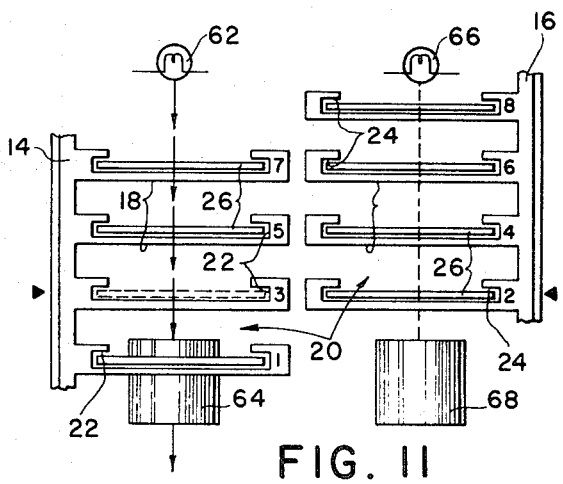
FIG. 11 is a view similar to FIG. 8 in which sequentially a dissolve occurs for projecting the third slide, and the second slide is returned to the second compartment.
Figure 12:
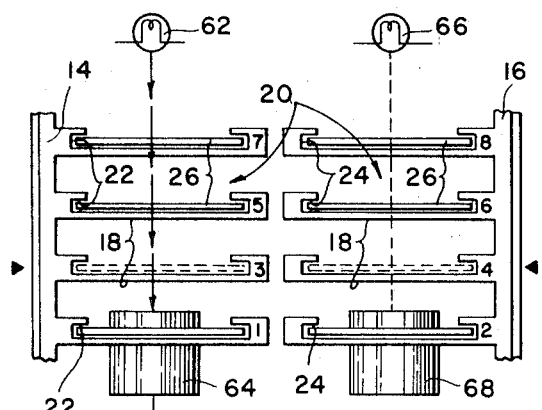
FIG. 12 is a view similar to FIG. 8 showing the right tray advanced one slide compartment, the fourth slide moved to its projection position, and the third slide being projected.
Figure 13:
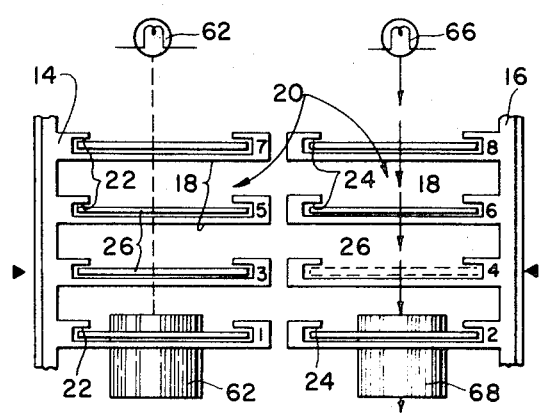
FIG. 13 is a view similar to FIG. 8 in which sequentially a dissolve occurs for projecting the fourth slide, and the third slide is returned to the third compartment.

With reference to FIGS. 8-13, the sequence of operations of the lap dissolve slide projector 45 will be described. Initially, the combined slide tray portions 14, 16 are placed on a receiving platform 60 of the slide projector, expanded to form two slide trays 14, 16, and the trays advanced to the position seen in FIG. 8. In this position, the first and second tray compartments are in register with the slide projection gates 44, 46 respectively and the slides contained therein have dropped into the slide projection gates. A projection lamp 62 is energized for projecting the first slide 26 through a lens turret 64 onto a screen, not shown. Following projection of the first slide, a lap dissolve from the first slide to the second slide is accomplished by gradually decreasing the brightness of the first image being displayed through the first projection system 62, 64 and gradually increasing the brightness of the second image being displayed through a projection system comprising lamp 66 and lens turret 68, both actions taking place simultaneously. In addition, substantially simultaneously with the dissolve action, the slide projector lifting mechanism 58 is actuated to return the first slide to its slide compartment as seen in FIG. 9. The first slide tray 14 is advanced one slide compartment, the third slide moves into the projection station 44, and the display of the second slide continued as seen in FIG. 10. Following display of the second slide, dissolve from the second slide to the third slide is accomplished by simultaneously gradually increasing the brightness of the third slide image for display and decreasing the brightness of the second slide image being displayed as seen in FIG. 11. In addition, the second slide is returned to its slide compartment. Following return of the second slide, the second slide tray portion 16 is advanced one slide tray compartment and the fourth slide moved into the projection station 46 as seen in FIG. 12. Following projection of the third slide, dissolve from the third slide to the fourth slide is accomplished by simultaneously gradually increasing the brightness of the fourth slide image for display and decreasing the brightness of the third slide being displayed. In addition, the third slide is returned to its slide compartment, as seen in FIG. 13. The described action continues until all of the slides have been projected.

The invention has been described in detail with particular reference to preferred embodiments thereof, but it will be understood that variations and modifications can be effected within the spirit and scope of the invention.

I claim:

1. A slide tray structure comprising:
a first tray portion comprising means defining a plurality of spaced compartments disposed in tandem for supporting film slides;
a second tray portion comprising means defining a plurality of spaced compartments disposed in tandem for supporting film slides; and
means coupling said first and said second tray portions for movement between a contracted position, in which said compartment defining means of said first and second tray portions interleave with each other to form a single row of compartments, and an expanded position, in which said compartment defining means of one of said portions is withdrawn from the other of said portions so as to form a pair of rows of compartments, the rows being separated in a direction transverse to the tandem direction.

2. The invention according to claim 1 wherein said coupling means comprises a link member having a first connecting means for connecting one portion of said link member to one end of the first tray portion, and a second connecting means for connecting another portion of said link member to one end of the second tray portion.

3. The invention according to claim 2 wherein said first and second connecting means each comprise means defining an elongated slot in one of said link member and tray portions, and a pin reciprocally movable in said slot defining means on the other of said link member and tray portions.

4. The invention according to claim 3 in which said slide tray portions are arranged in side-by-side, parallel relation, and said link member is provided at each of the adjacent ends of said first and second tray portions.

5. The invention according to claim 1 and further including detent means for releasably holding said first and second tray portions in said contracted position.

6. A slide tray structure comprising:
a first tray portion having only one side wall and a plurality of spaced divider walls extending laterally from said side wall, each adjacent pair of divider walls forming a slide compartment;
a second tray portion having only one side wall and a plurality of spaced divider walls extending laterally from said side wall of said second tray portion, each adjacent pair of divider walls of said second tray portion forming a slide compartment; and
means coupling said first and second tray portions for movement between a contracted position, in which said divider walls of said first and second tray portions interleave with each other in a manner to form a single row of compartments, and an expanded position, in which said divider walls of said first and second tray portions are withdrawn from interleaved condition so as to form two rows of slide compartments.

7. The invention according to claim 6 wherein said slide compartments are open ended, and means are provided for releasably holding each of slides in said slide compartments.

8. The invention according to claim 6 and further including detent means for releasably holding said first and second tray portions in said contracted position.

* * * * *